United States Patent Office 3,032,238
Patented May 1, 1962

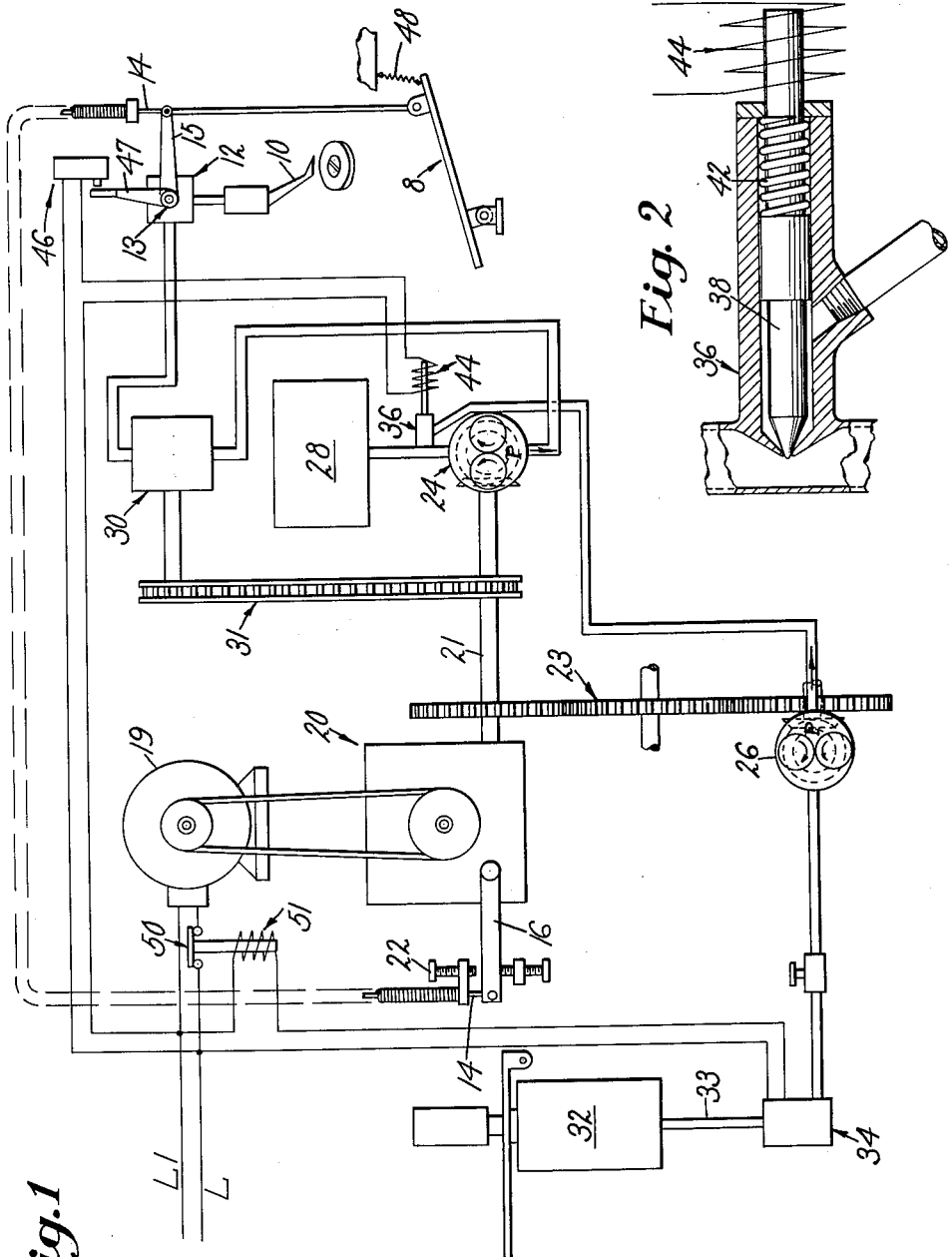

3,032,238
MIXING AND APPLYING APPARATUS
Hans C. Paulsen, Lexington, Mass., assignor to United Shoe Machinery Corporation, Boston, Mass., a corporation of New Jersey
Filed Feb. 25, 1959, Ser. No. 795,486
4 Claims. (Cl. 222—138)

This invention relates to apparatus for applying an adhesive coating to shoe parts. More particularly the apparatus is adapted to mix accurately an adhesive having two components and to apply such mixture to a member to be coated.

In the manufacture of shoes it is especially important when combining shoe parts by cement that an extremely firm bond be established between the parts. This is especially true when combining a sole member to the bottom of a shoe on a last so that the sole will conform to the shape of the last. Cements used in the past, however, required maintaining the sole member against the shoe bottom under considerable pressure for a substantial length of time in order to form a bond sufficient to maintain the shape of the shoe bottom. Recently, however, relatively inexpensive cements have been developed which, upon addition of a catalyst, effect a quick initial bond having strength sufficient to maintain the shoe parts in the desired shape after being held under pressure a relatively short time. However, due to certain characteristics of the cement mixture, as will appear, ordinary cement handling and applying devices are completely unsuitable for handling such cements.

For maximum effectiveness this type of cement must be mixed with the catalyst at a critical ratio. If the catalyst content is too low, the bonding time of the cement will be unduly long rendering the cement mixture useless. If the catalyst content is too high the cement mixture will harden quickly, disabling the apparatus in which it is handled.

Accordingly, it is an object of the invention to provide an improved apparatus which is capable of mixing catalyst and cement in an accurately fixed ratio. To this end, two separate reservoirs are provided, one for the main body of the cement and one for the catalyst. The inlet of a first pump is connected to the reservoir and its outlet is connected to other mixing and applying devices. The inlet of a second pump is connected to the catalyst reservoir and its outlet is also connected to the inlet of the first pump in such manner that the catalyst is pumped directly into the stream of cement flowing into the first pump. Both pumps are driven at a fixed speed ratio from a common source of power so that the cement and catalyst are mixed at an accurately fixed ratio. The first pump thus acts to mix the cement and catalyst supplied to its inlet as well as to feed the mixture to a mixing unit which insures that the two components are thoroughly mixed before application.

Since the cement hardens quickly when exposed to any substantial body of catalyst it is essential that the handling apparatus be adapted to prevent uncontrolled mixture of the cement and catalyst. Such mixture is most likely to occur in the present apparatus when the above pumps are stopped between periods of cement application. At that time the catalyst between the second named pump and the inlet of the first pump remains under pressure while the cement between the inlet of the first pump and the cement reservoir is only under the pressure of gravity. Thus, if uncontrolled, the catalyst will tend to be forced out into the cement upsetting the critical mixture ratio and exposing the cement to a substantial body of catalyst since the catalyst tends to puddle rather than mix easily with the cement. Thus, at the point of mixture a hardened block of cement could be formed, disabling the apparatus. Accordingly, it is another object of the invention to provide a normally closed valve at the point of mixture to prevent flow of excess catalyst into contact with the cement when the pumps are stopped. The valve is also arranged to be opened automatically whenever the pumps are driven to allow proper mixture of the cement and catalyst.

The above and other features of the invention together with novel details of construction will now be described with reference to the drawings and thereafter particularly pointed out in the claims.

In the drawings,
FIG. 1 is a diagrammatic illustration of the cement mixing and applying devices; and
FIG. 2 is a sectional view of one of the valves utilized.

Referring to FIG. 1 a nozzle 10 is provided to direct cement under pressure onto a shoe part presented thereto. Flow of cement from the nozzle is controlled by a valve 12 which is opened and closed by means of a treadle 8 actuated by an operator. The movable element (not shown) of the valve is fixed to a bell crank 13 having an arm 15 connected to the treadle in such manner that depression of the treadle by the operator causes the valve to be opened so that cement may be delivered from the nozzle 10. The arm 15 also is connected by means of a flexible wire 14 to a control arm 16 of an hydraulic variable speed drive unit 20. Thus, in addiiton to opening the valve 12, depression of the treadle moves the control arm 16 to driving position for a purpose which will presently appear.

The unit 20 includes an hydraulically operated variable speed transmission of well-known type and has its power input supplied by a constant speed motor 19. The variable speed output of the unit is delivered by rotation of a shaft 21 from zero speed to any speed desired as determined by the position of the control arm 16. As seen tin FIG. 1, the arm 16 is in stop position and the shaft 21 is stationary. Movement of the arm 16 in a clockwise direction causes the shaft to be driven. A stop screw 22 limits the movement of the arm and thus also determines the maximum speed of the shaft 21. The shaft 21 is connected to a pump 24 and through suitable gearing 23 to a pump 26 for differentially driving the pumps at a fixed relative speed ratio. The pump 24 has its inlet connected to a reservoir 28 containing the cement and its outlet connected to a mixer 30 also driven from the shaft 21 through a chain and sprocket drive 31. The outlet of the mixer 30 is connected through the valve 12 to the nozzle. The pump 26 has its inlet connected by a pipe 33 to a reservoir 32 containing a catalyst. The outlet of the pump 26 is connected to the inlet of the pump 24 through a valve 36 in a manner which is clearly shown in FIG. 2 so that the catalyst is pumped directly into the stream of cement flowing into the pump 24. This valve is provided with a valve element 38 which is normally closed by a spring 42. One end of the element 38 forms an armature of a solenoid coil 44 which is connected in series with a normally open switch 46. The switch 46 is adapted to be closed by an arm 47 of the bell crank 13 whenever depression of the treadle opens the nozzle valve 12. As seen in FIG. 1, closure of the switch 46 energizes the coil 44 to open the valve 36 by closing a circuit from a line wire L through the switch 46, through the coil 44, and to a line wire L1. The lint wires L and L1 are connected to a suitable source of electrical power.

From the foregoing it will be seen that depression of the treadle 8 actuates the control arm 16 to cause the unit 20 to drive the pumps 24 and 26 at predetermined relative rates of speed, causes the solenoid valve 36 to be opened to permit catalyst to be pumped from the reservoir 32 into the inlet of the pump 26, and opens the valve 12 to allow the mixture of cement and catalyst to be extruded from the nozzle 10. When the treadle 8 is released, a spring 48 attached to the treadle causes the bell crank 13 to be moved counterclockwise closing the valve 12, opening the switch 46 and returning the control arm 16 to its stop position. In this manner closure of the valve 12 prevents cement from drooling from the nozzle 10 while the position of the control arm 16 stops the drive of the pumps 24 and 26, as well as the mixing unit 30, and opens the switch 46 to deenergize the solenoid coil 44 causing the valve 36 to close. Thus it will be understood that by closing the valve 36 when the pumps are stopped, premature and uncontrolled mixing of the catalyst and cement is prevented to avoid upsetting the critical mixture ratio as well as preventing hardening of the cement at the inlet of the pump 24 by exposure to excessive amounts of catalyst.

Since the full advantage of the above cement can only be realized by addition of a catalyst, it is essential that means be provided to prevent operation of the apparatus when the supply of catalyst is depleted. To this end a float actuated switch 34 of any suitable type is provided in the pipe 33 leading from the catalyst reservoir 32 to the pump 26. The switch is adapted to be closed only when there is catalyst in the pipe to permit normal operation of the apparatus by causing a power circuit to be closed to the motor 19 from the line wire L through a relay switch 50. The relay switch is closed by energization of a relay coil 51 through a circuit from the line wire L, the switch 34 when closed, and through the relay coil to the line wire L1. The switch 34 is also adapted to be opened upon depletion of the catalyst in the pipe 33, thus deenergizing the relay coil 51, thereby causing the power circuit to the motor 19 to be opened preventing operation of the apparatus. Thus the apparatus can be operated to mix and apply cement only when a continuous supply of catalyst is available to be mixed with the cement.

Having thus described my invention, what I claim as new and desire to secure by Letters Patent of the United States is:

1. In a machine for mixing and delivering fluid material having two components which must be forcibly mixed, the combination of a first reservoir for a first component, a second reservoir for a second component, a first pump having its inlet connected to the first reservoir, a second pump having its inlet connected to the second reservoir, means for delivering the second component from the outlet of the second pump into the stream of the first component entering the inlet of the first pump for causing the first and second components to be mixed forcibly by the first pump, and means for driving the first and second pumps at predetermined relative rates for causing a predetermined ratio of said components to be mixed and delivered from the output of the first pump.

2. In a machine for mixing and delivering fluid material having two components, the combination of a first reservoir for a first component, a second reservoir for a second component, a first pump having its inlet connected to the first reservoir, a second pump having its inlet connected to the second reservoir, means for delivering the second component from the outlet of the second pump into the stream of the first component entering the inlet of the first pump, means for driving the first and second pumps at predetermined relative rates for causing a predetermined ratio of said components to be mixed and delivered from the output of the first pump, said delivering means including a valve at the point of delivery of the second component, and means for opening said valve upon starting said driving means and for closing said valve upon stopping said driving means.

3. In a machine for mixing and delivering a fluid material having two components, the combination of a first reservoir for a first component, a second reservoir for a second component, a first pump having its inlet connected to the first reservoir, a second pump having its inlet connected to the second reservoir and its output also connected to the inlet of said first pump, means for driving the first and second pumps at predetermined relative rates for causing a predetermined ratio of said components to be mixed and delivered from the output of the first pump, and a valve operated upon starting said driving means for opening the output of the second pump and operated upon stopping said driving means for closing the output of the second pump thereby preventing uncontrolled mixing of said components when said pumps are not being driven.

4. In a machine for mixing and applying cement having a predetermined mixture of two components, the combination of a first reservoir for a first component, a second reservoir for a second component, a first pump having its inlet connected to the first reservoir, a second pump having its inlet connected to the second reservoir and its outlet also connected to the inlet of the first pump for delivering the second component into the stream of the first component entering the inlet of the first pump, a first valve at the point of delivery of the second component for opening and closing the outlet of the second pump, means for driving the first and second pumps at predetermined relative rates for causing a predetermined ratio of said components to be mixed and delivered from the outlet of the first pump, a nozzle connected to the outlet of the first pump for delivering the mixture of said components, a second valve for opening and closing the output of the first pump to the nozzle, and control means for stopping and starting the driving means, said control means also being effective to open the first and second valves upon starting the driving means and also being effective to close the first and second valves upon stopping the driving means.

References Cited in the file of this patent

UNITED STATES PATENTS

| | | |
|---|---|---|
| 1,964,028 | Boynton et al. | June 26, 1934 |
| 2,142,062 | Thurman | Dec. 27, 1938 |